United States Patent [19]

Boettner et al.

[11] Patent Number: 4,777,589
[45] Date of Patent: Oct. 11, 1988

[54] DIRECT INPUT/OUTPUT IN A VIRTUAL MEMORY SYSTEM

[75] Inventors: Steven C. Boettner, San Jose; William R. Bryg, Saratoga; David V. James, Palo Alto; Tso-Kai Liu, Saratoga; Michael J. Mahon, San Jose; Terrence C. Miller, Menlo Park; William S. Worley, Jr., Saratoga, all of Calif.

[73] Assignee: Hewlett-Packard Company, Palo Alto, Calif.

[21] Appl. No.: 750,578

[22] Filed: Jun. 28, 1985

[51] Int. Cl.⁴ .................. G06F 12/06; G06F 12/08
[52] U.S. Cl. .................................................. 364/200
[58] Field of Search ... 364/200 MS File, 900 MS File

[56] References Cited

U.S. PATENT DOCUMENTS

| 3,654,621 | 4/1972 | Bock | 364/200 |
|---|---|---|---|
| 4,439,830 | 3/1984 | Chueh | 364/200 |
| 4,442,484 | 4/1984 | Childs et al. | 364/200 |
| 4,477,871 | 10/1984 | Keshlear | 364/200 |
| 4,493,023 | 1/1985 | Gavrin et al. | 364/200 |
| 4,635,189 | 1/1987 | Kendall | 364/200 |
| 4,654,777 | 3/1987 | Nakamura | 364/200 |

Primary Examiner—Raulfe B. Zache
Assistant Examiner—A. Mohamed

[57] ABSTRACT

A virtual memory system is used to control access to I/O device address space in accordance with a preferred embodiment of the present invention. In a virtual memory system, access to pages within a processor's address space are assigned to each application program. Each I/O device is assigned two pages of address space. One page is considered to be privileged, and the other unprivileged. Each I/O device register is associated with an address in each of the two pages of its I/O device address space. Address space is global. What is meant by global is that physical memory locations map to the same virtual memory space regardless of what process is running on the processor. Access codes accompanied by a write disable bit are used to control process access to various addresses.

7 Claims, 9 Drawing Sheets

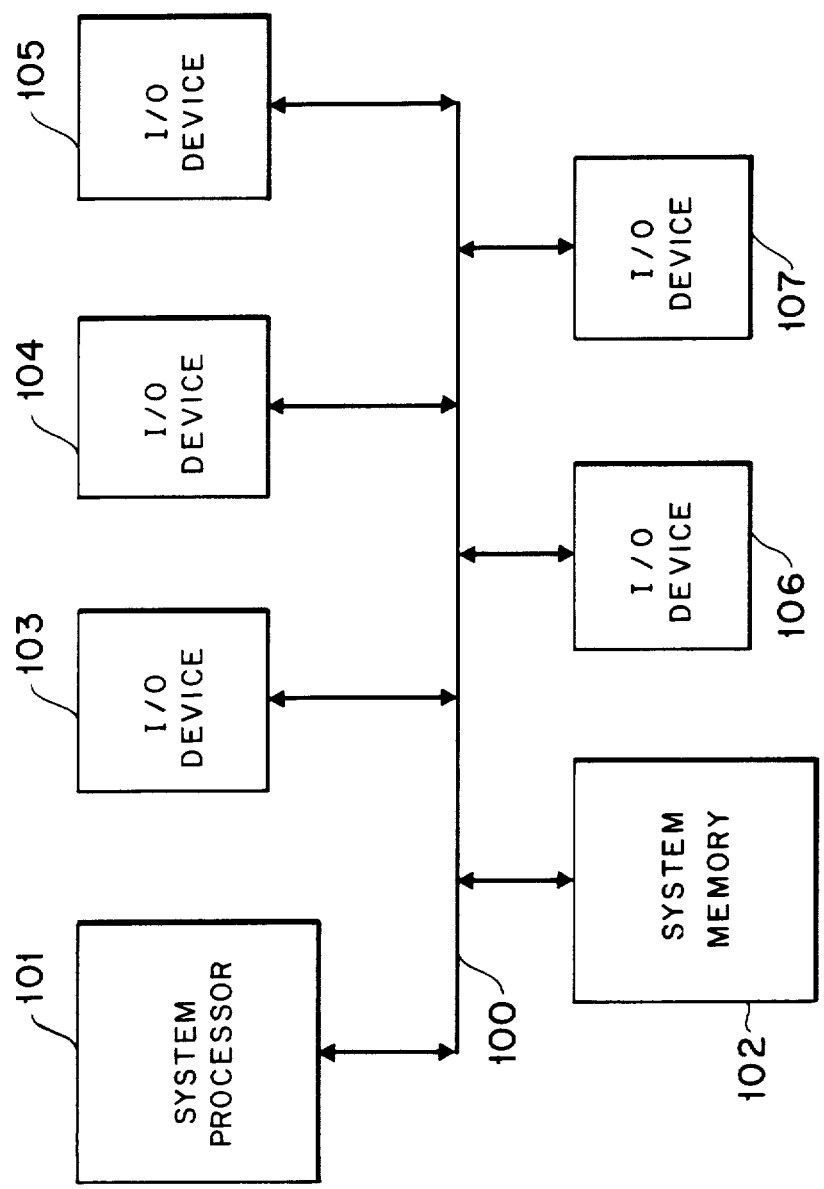

DIRECT INPUT/OUTPUT IN A VIRTUAL MEMORY SYSTEM

BACKGROUND

The present invention concerns virtual memory systems in general and as they pertain to the way a computing system processor allows processes to access input/output (I/O) devices. In the prior art, each process running on a computer system has had its own virtual address space. This can lead to very complex systems and non-optimal performance. For instance, a separate page table needs to be kept for each process. A page table maps virtual memory addresses to physical locations in memory. Furthermore, if each process has its own virtual address space, each time processes are swapped in a computer, translation buffers and cache entries from the prior process must be invalidated.

Additionally, in prior art virtual memory systems, I/O devices have been accessed by one of two methods. In the first method, special instructions are provided within the computer instruction set which control I/O devices. In the second method, referred to as memory mapped I/O, certain addresses are reserved for each I/O device. The reserved addresses for each I/O device are called its address space. In memory mapped I/O systems, I/O devices detect and decode when a processor reads or writes to addresses within that I/O device's I/O address space. Each register within an I/O device is associated with an address within the address space. The registers are implemented in such a way that a read or a write to an address within an I/O device's address space results in a read or a write to a register within the I/O device associated with the specific address. The act of reading or writing to addresses within an I/O device address space can thus be used to control I/O devices.

One advantage of using memory mapped I/O systems is that I/O devices can be accessed by procedures implemented in a higher level language. In some prior art computer architectures, an application program is allowed to directly access all or a portion of the computer's I/O devices' address space. This, however, may lead to difficulties in a multi-tasking environment. For instance, if one application program misinitializes an I/O device which is able to perform direct memory access (DMA) transfers, this might cause the I/O device to read or write over memory space assigned to another application program, thus compromising system security.

Some prior art schemes, in order to avoid compromising system security in multi-tasking environments, prevent application programs from directly accessing the address spaces of I/O devices. Instead, all I/O addresses can be accessed only through privileged procedures called I/O drivers. This, while providing a high level of system security, nevertheless adds a lot of software overhead and is inefficient and restrictive.

SUMMARY OF THE INVENTION

In accordance with a preferred embodiment of the present invention, address space in a virtual memory system is global. What is meant by global is that physical memory locations map to the same virtual memory space regardless of what process is running on the processor. Access codes accompanied by a write disable bit are used to control process access to various addresses.

Additionally, attributes of a virtual memory system are used to control access to I/O device address space. In a virtual memory system, access to pages within a processor's address space are assigned to each application program. The access may be the ability to read information stored in the address space (read access), or it may be the ability to read information stored in the address space and the ability to write information to the address space (both read access and write access).

In the preferred embodiment of the present invention, each I/O device is assigned two pages of address space. One page is considered to be privileged, and the other unprivileged. Because a page may be very large—for example a page may contain 512 addresses—many addresses in each page of address space may have no I/O device registers associated with them.

Each I/O device register, however, is associated with an address in each of the two pages of its I/O device address space. The addresses in their respective pages associated with a single register each have the same offset in respect to their individual pages. Registers are considered to be privileged or unprivileged. A register may be considered privileged if it is involved in controlling an I/O device's DMA activity, if it is involved in generating interrupts to a processor, or if it may be used in some other way to compromise system security Unprivileged registers may be fully implemented in both the privileged page and the unprivileged page. What is meant by fully implemented in both the privileged page and the unprivileged page is that a read or a write to the address associated with the unprivileged register in either the privileged page or the unprivileged page results in a read or a write to the unprivileged register.

Privileged registers may be fully implemented in only the privileged page. This means that a read or a write to the address associated with the privileged register in only the privileged page results in a read or a write to the privileged register. Depending upon implementation, in the unprivileged page privileged registers may be readable but not writeable, or alternatively, may be neither readable nor writeable.

BRIEF DESCRIPTION OF THE DRAWINGS

FIG. 1 shows a system processor, a system memory, and various I/O devices coupled to a bus.

DESCRIPTION OF THE PREFERRED EMBODIMENT

Figure 2A:
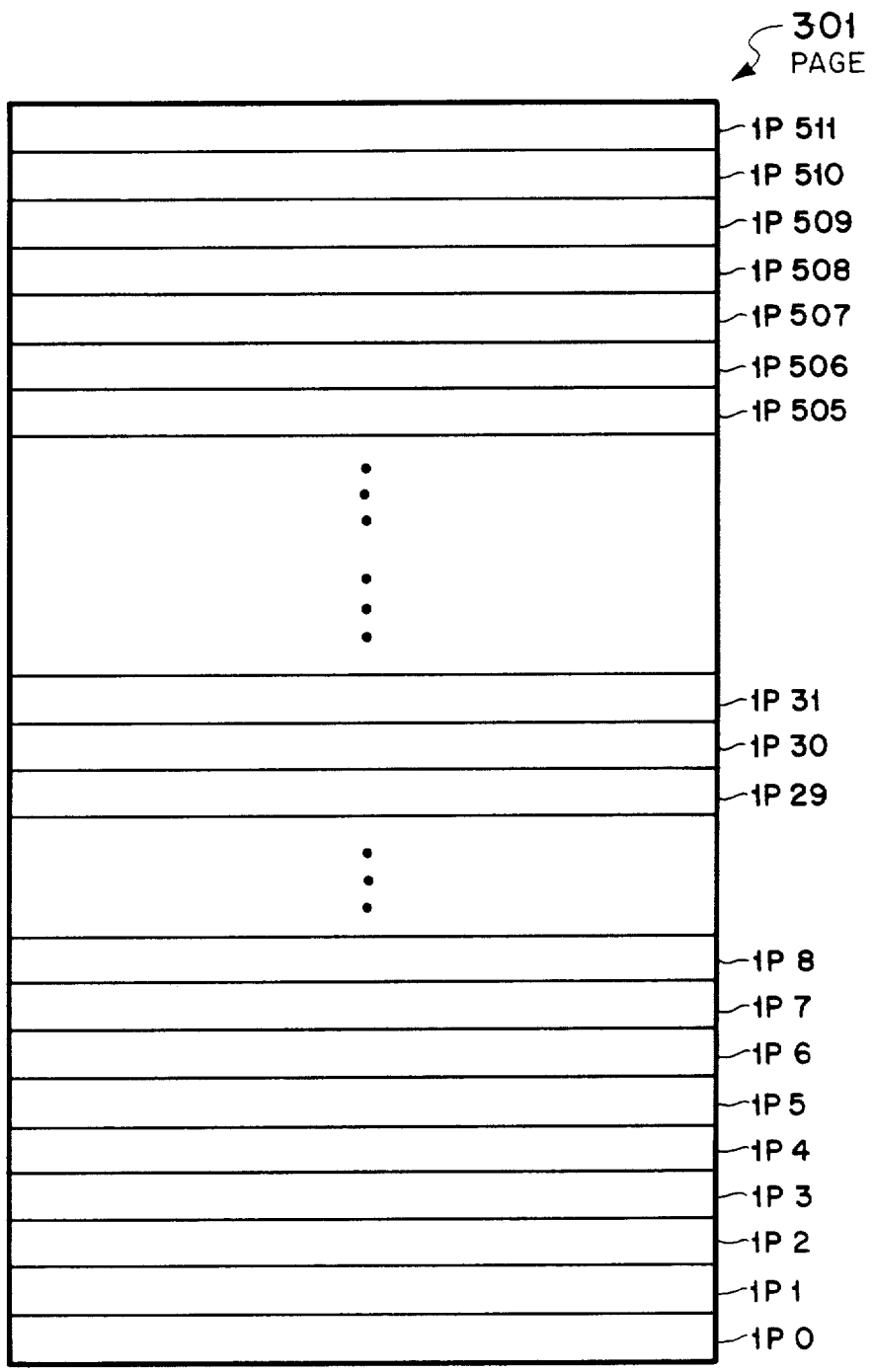
FIG. 2A and FIG. 2B each show a page of memory address space.

In FIG. 1 a computing system is shown. The computing system includes a system processor 101, a system memory 102, an input/output (I/O) device 103, an I/O device 104, an I/O device 105, an I/O device 106, and an I/O device 107 are coupled to a bus 100. System processor 101 communicates to I/O devices 103–107 by reading data from or writing data to address space reserved for each of I/O devices 103–107.

Figure 3:
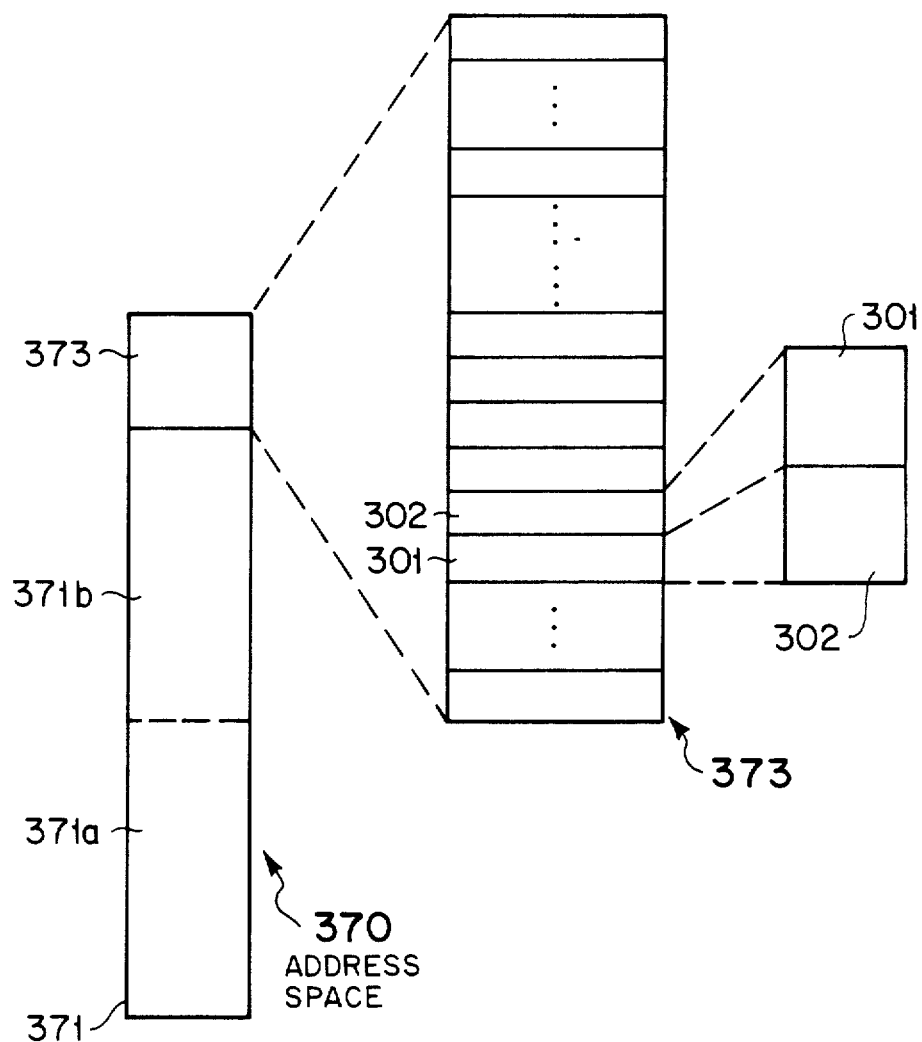
FIGS. 3 and 3A show a memory address space and the corresponding address format of a computer in accordance with the preferred embodiment of the present invention.

FIG. 3 shows how an address space 370 of the computing system shown in FIG. 1 is allocated. Address space 370 addresses $2^{32}$ bytes of data (or $2^{30}$ 32-bit words of data). A portion 371 of address space 370 is reserved for memory addresses. A subportion 371b of portion 371 is reserved for memory addresses but is unimplemented. A subportion 371a of portion 371 is implemented and used by an operating system running on processor 101, and by user applications running on processor 101. In general subportion 371b is significantly larger than subportion 371a. A portion 373 of address space 370 is allocated to be used for I/O devices. All of memory 370 is divided into pages, including page 301 and 302 as shown. Each page is able to address 512 32-bit words.

Figure 5:
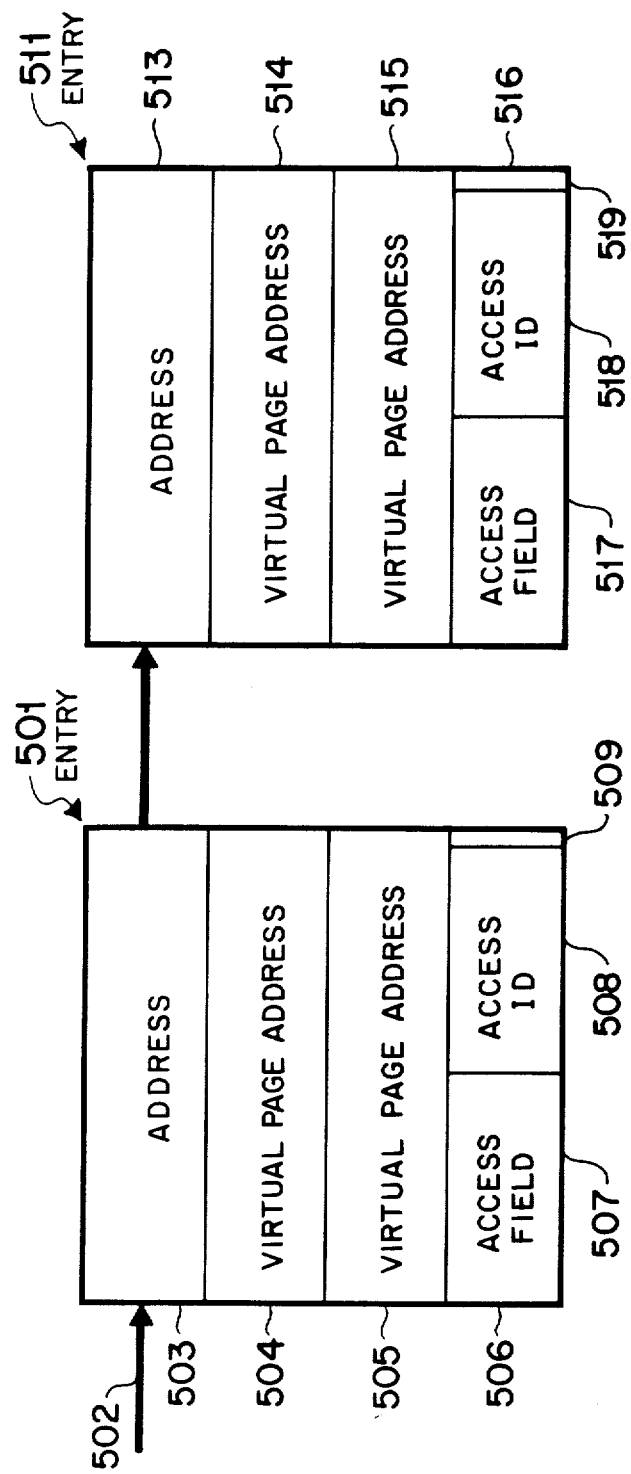
FIG. 5 shows two entries in a table which translates virtual memory addresses to physical memory addresses.
Figure 6:
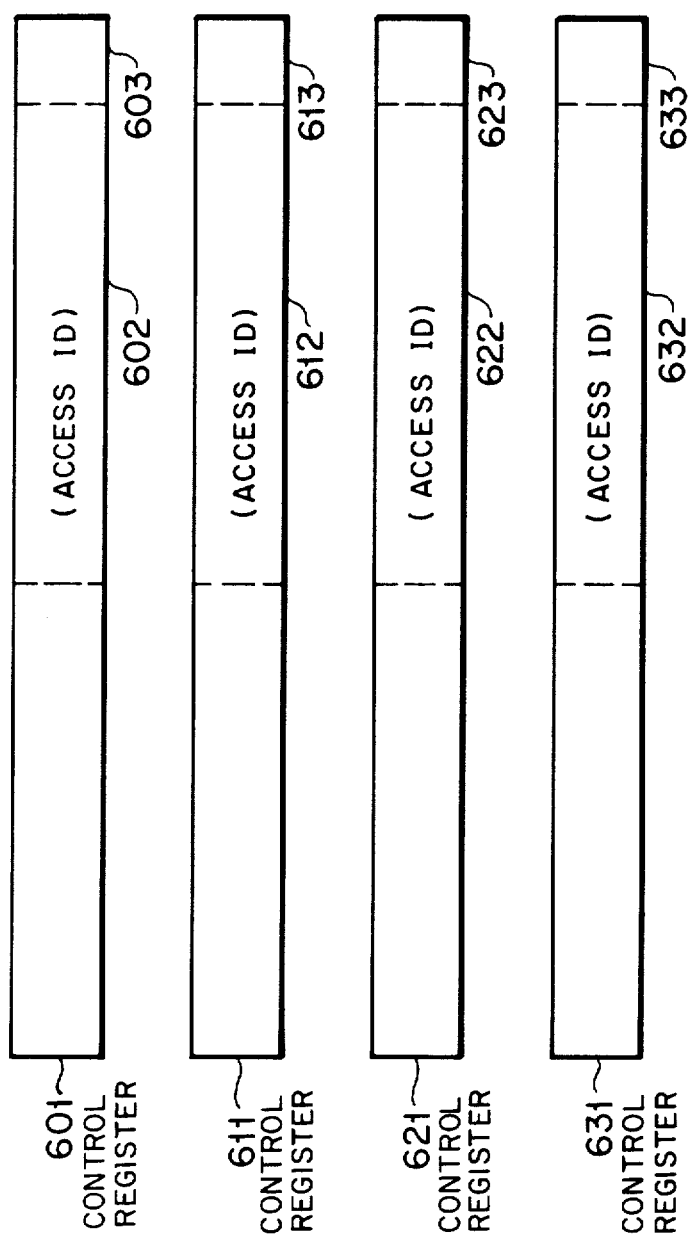
FIG. 6 shows control registers within the system processor shown in FIG. 1.
Figure 7:
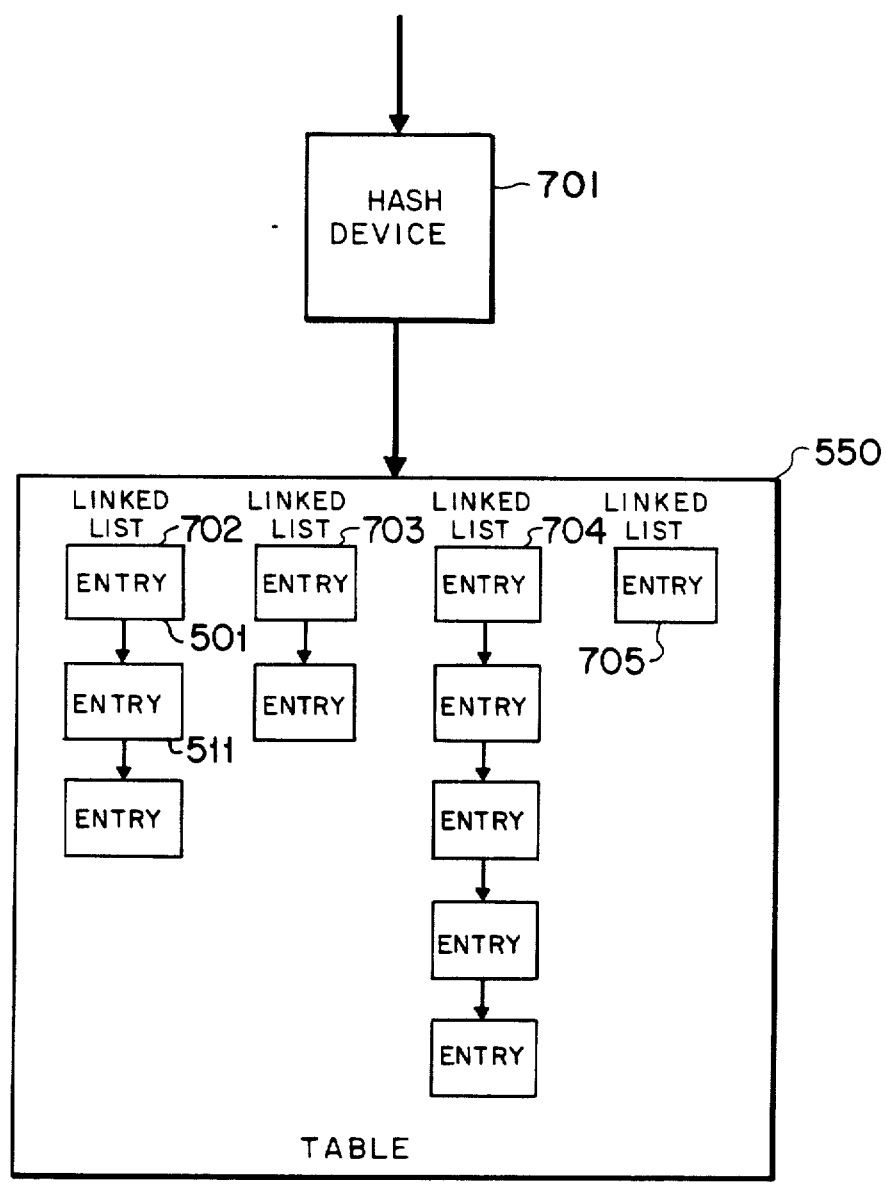
FIG. 7 shows the table containing the entries shown in FIG. 5.

Access to memory pages may be restricted by the use of a access identification (AID) value associated with entries in a table 550, shown in FIG. 7. Table 550 translates virtual memory page addresses to addresses of memory pages in physical memory space in system memory 102. Table 550 includes a series of linked lists. For example linked list 702, linked list 703, linked list 704 and linked list 705 are shown in FIG. 550. An entry 501 and an entry 511 in linked list 702 are shown in FIG. 5. Entry 501 and entry 511 each contain four 32-bit memory locations.

Entry 501 includes a location 503 which contains an address which points to entry 511. Entry 501 also includes a location 504 and a location 505 which contain a virtual page address. The location of entry 501 in table 550 indicates to system processor 101 the physical memory space for the virtual page address stored in locations 504 and 505. Entry 501 also includes a location 506. Location 506 includes a sixteen-bit access rights field 507 and a fifteen-bit section 508 which contains an AID value and a one-bit section 509 which always contains a logic 0.

Entry 511 includes a location 513 which contains an address which points to a next entry in linked list 702. Entry 511 also includes a location 514 and a location 515 which contain a virtual page address. The location of entry 511 in table 550 indicates to system processor 101 the physical memory address for the virtual page address stored in locations 514 and 515. Entry also includes a location 516. Location 516 includes a sixteen-bit access rights section 517 and a fifteen-bit section which contains an AID value and a one-bit section 519 which always contains a logic 0.

System processor 101 has four control registers 601, 611, 621 and 631 which contain AID Values for a currently running process. Section 602 of register 601, section 612 of register 611, section 622 of register 621, and section 632 of register 631 each may contain a fifteen-bit AID value. Section 603 of register 601, section 613 of register 611, section 623 of register 621, and section 633 of register 631 contain one bit write disable value (WD).

When a process running on system processor 101 requests to address a physical page of memory, a virtual address for a page of memory is translated to a physical page address using table 550. A has device 701, shown in FIG. 7, receives the virtual address and hashes the virtual address, to produce a physical page address corresponding to the position of a first entry in a linked list in table 550. For instance, hashing a virtual page address may produce a physical address corresponding to entry 501 in table 550. The virtual address that has been hashed is compared with the virtual address contained in locations 504 and 505 of entry 501. If these match, the physical page has been mapped to the virtual page.

An access code in access rights field 507 is checked. The access code indicates at what privilege level a process must be at to be allowed read, write, and/or execute access to the physical page. Then the AID value contained in location 508 is checked. If the AID value contained in location 508 is 0, or if it matches AID values in one of control registers 601, 611, 621 or 631, then the process is granted access to the physical page in memory. If the WD value in the matching control register 601, 611, 621, or 631 is at logic one, the process is denied write access. If the AID value contained in location 508 does not match AID values in any of control registers 601, 611, 621, or 631, and if the AID value contained in location 508 does not equal 0, then the process is denied access to the physical page in memory.

If the virtual address that has been hashed does not match the virtual address contained in locations 504 and 505, the next entry in linked list 702—entry 511—is considered. The virtual address that has been hashed is compared with the virtual address contained in locations 514 and 515 of entry 511. If these match, an access code in access rights field 517 is checked. The current privilege level of the process is evaluated to determine what access may be granted the process. Then the AID value contained in location 518 is compared with AID values in control registers 601, 611, 621 and 631. And so on.

Figure 8:
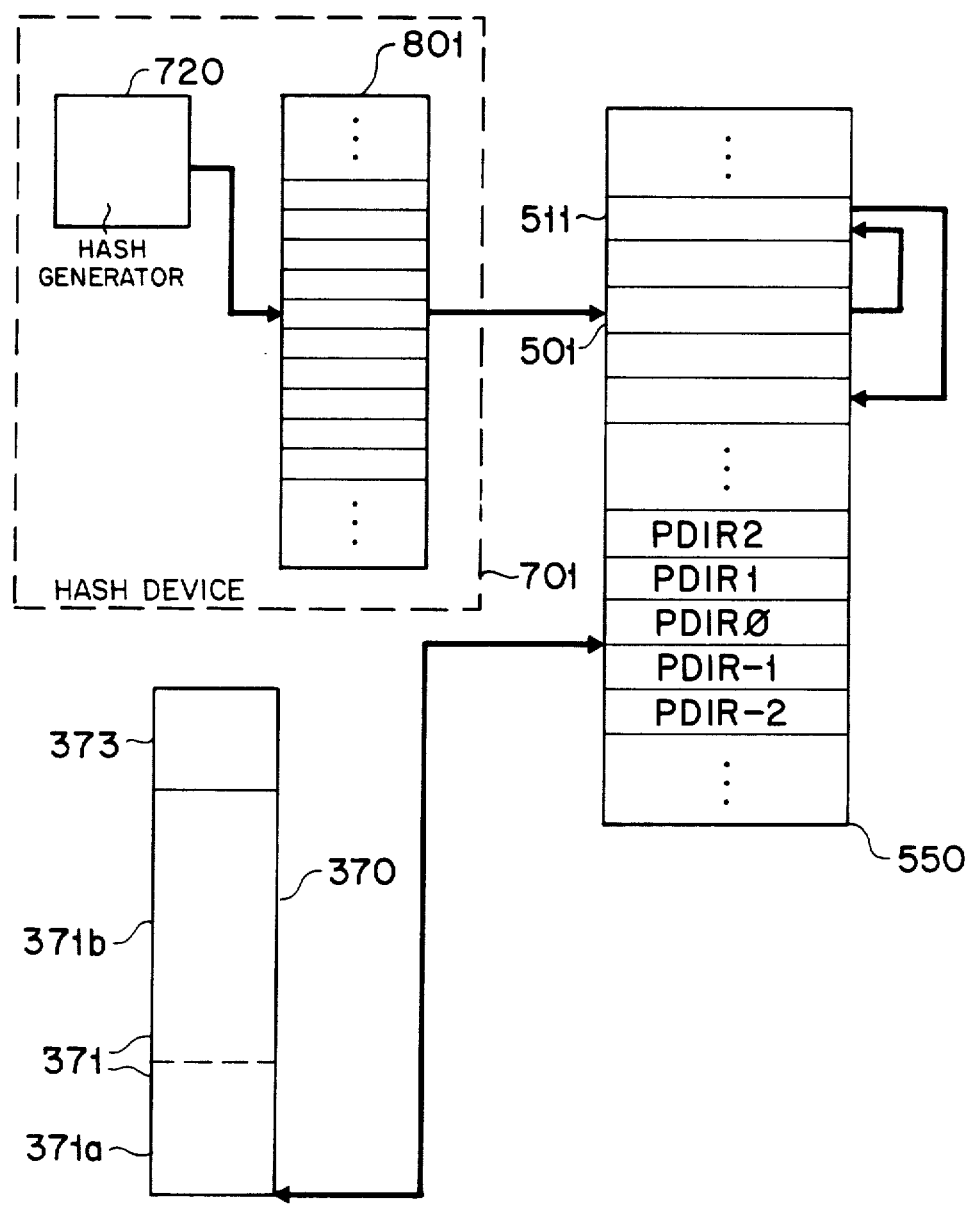
FIG. 8 shows a hash device and a table in accordance with the preferred embodiment of the present invention.

FIG. 8 shows hash device 701 and table 550. Hash device 701 includes a hash generator 720 and a hash table 801. Hash generator 720 receives a virtual address and produces a hash table address. The contents of the hash table address is checked. If the contents are a null pointer, the data addressed by the virtual address is not in main memory. If the contents are an address in table 550, a linked list starting at the address in table 550 is searched until, as explained above, an entry containing the virtual address is found, or until a null pointer is found. The null pointer again would indicate the data addressed by the virtual address is not in main memory. If the data addressed is not in main memory, a page fault occurs and software is generally used to bring in the data from a disk or other storage device.

Table 550 is shown to be a page directory. Table 550 has a base address at entry PDIR0. PDIR0 corresponds to an address at the bottom of address space 370. Positive entries in table 550 then correspond to pages within portion 371 of memory. Pages in portion 373 of address space 370 also need to be addressed by entries in table 550. To avoid having a large unused portion of entries in table 550 corresponding to unused subportion 371b of portion 371, addresses in portion 373 of table 370 are addressed using negative entries in table 550. For instance, PDIR-1 corresponds to an address at the top of address space 370. In this way portion 373 of address space 370 can be addressed without having a large gap in table 550 corresponding to unused subportion 371b of address space 370.

Figure 3A:
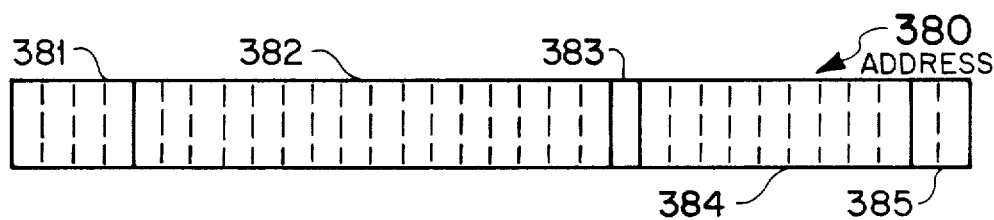

FIG. 3A shows how bits of a physical address in portion 373 are allocated., A section 381 contains the four most significant bits of an address 380. Portion 373 is at the top of address space 370; consequently, each bit in section 381 is a logic 1, indicating an I/O device register is being addressed. A section 382 contains sixteen bits of address 380. The sixteen bits in section 382 determine which I/O device is being addressed. In the present embodiment there is address space available for $2^{16}$ (approximately 65,000) I/O devices. A bit 383 indicates whether a privileged page or an unprivileged page is being addressed. A section of bits 384 of address 380 indicate which specific register within an I/O device is being addressed. A section of bits 385 contains two bits of address 380. Both bits in section 385 are at logic 0, because in the present embodiment registers are addressed in 32-bit words, while address space 370 allows addressing of 8-bit bytes.

Figure 4:
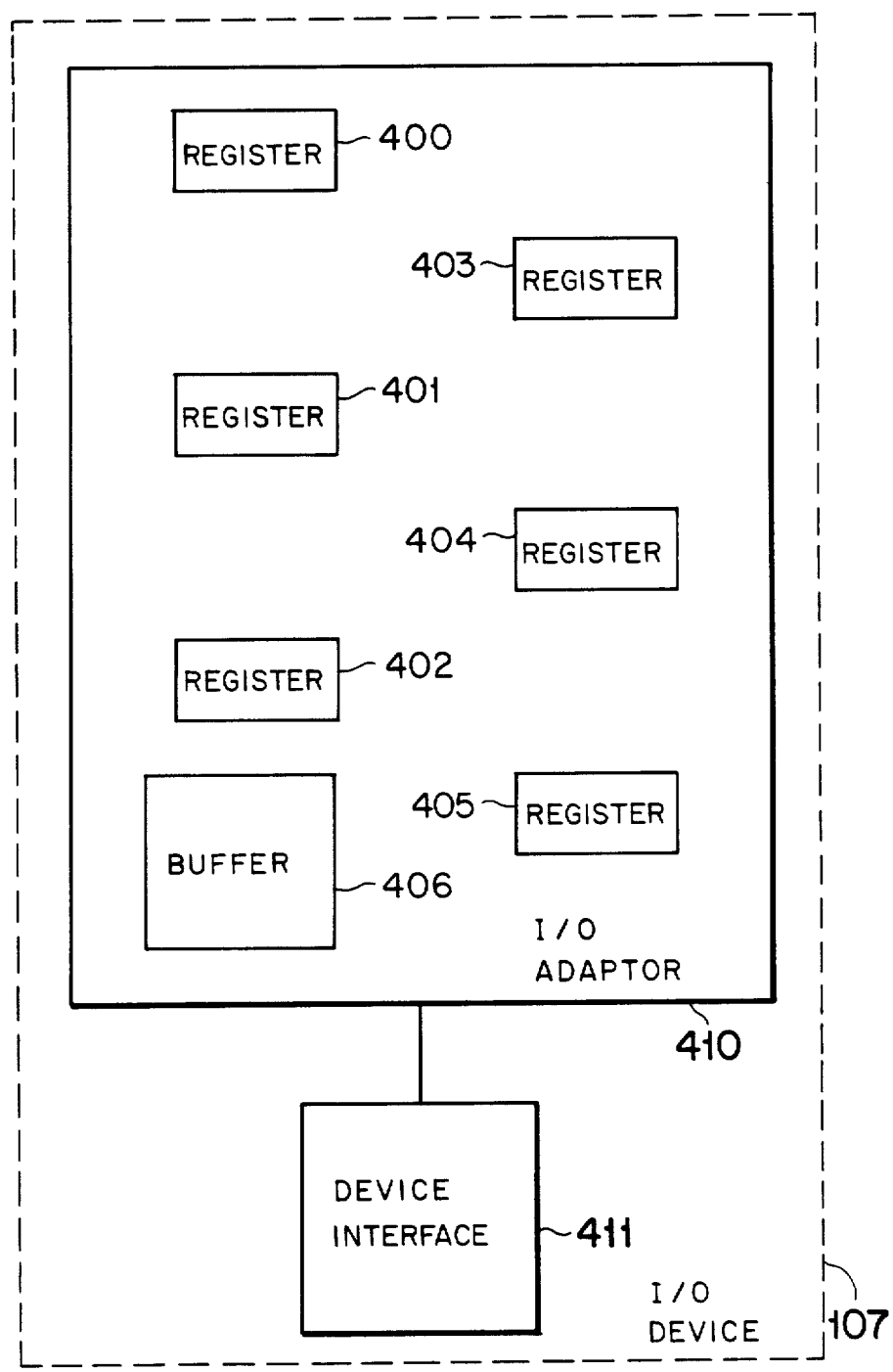
FIG. 4 shows a block diagram of one of the I/O devices shown in FIG. 1.

In FIG. 4, I/O device 107 is shown to include an I/O adaptor 410 and a device interface 411. For the purpose of illustration, a register 400, a register 401, a register 402, a register 403, a register 404, a register 405 and a buffer 406 are shown to be within I/O adaptor 410. Register 400 contains an address which when written to generates an interrupt of system processor 101. Register 401 receives commands which direct I/O device 107 to, for example, initialize device interface 411, read a datum from device interface 411, or write a datum to device interface 411. Register 402 contains a number representing an address within system memory 102, starting at which I/O adaptor 410 is to perform a direct memory access (DMA) transfer. Register 403 contains a byte count indicating an amount of data to be transferred to system memory 102 by a DMA transfer. Register 404 receives a command to start or stop a DMA transfer. Register 405 contains information about the status of the last DMA transaction between I/O adaptor 410 and system memory 402.

Figure 2B:
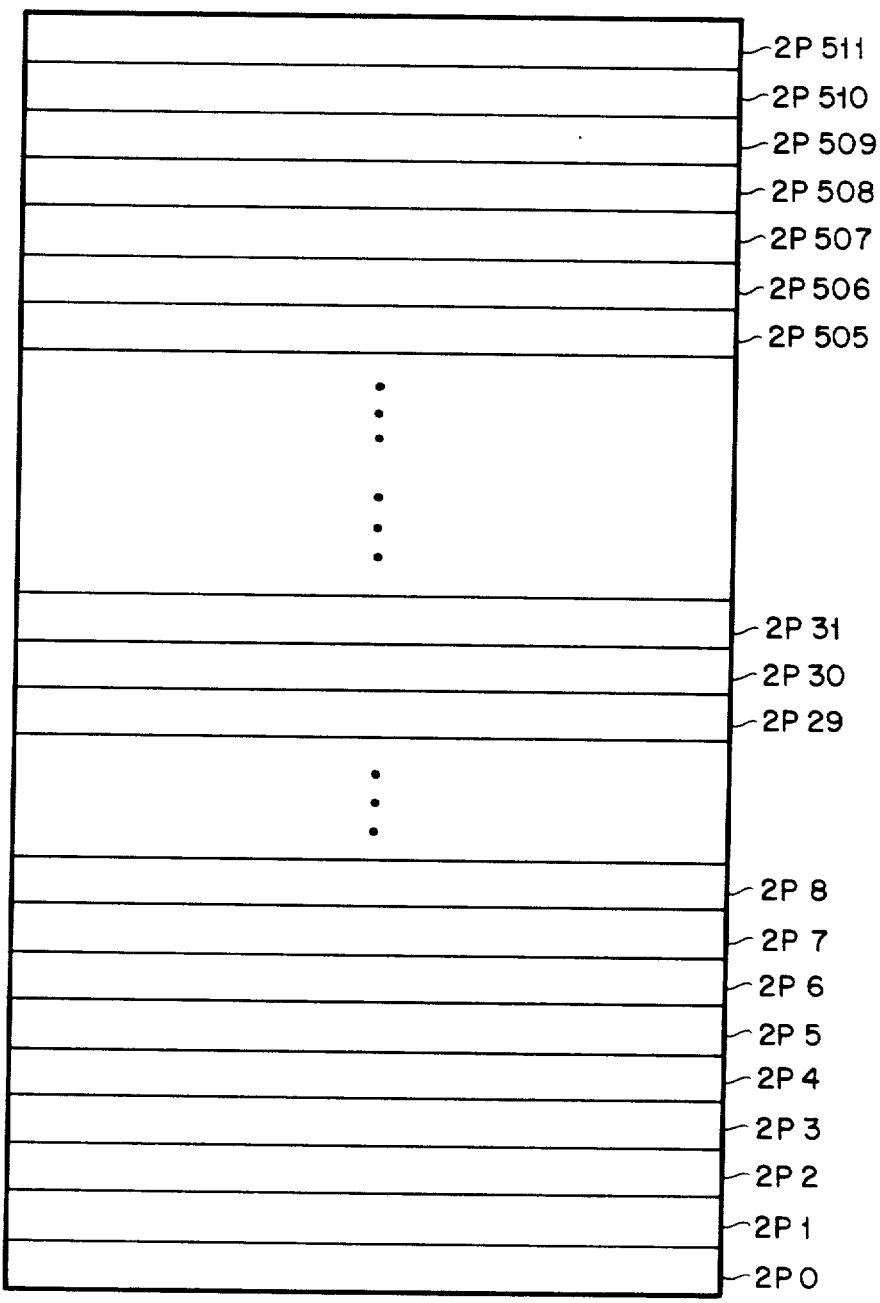

FIG. 2A shows an unprivileged page of address space 301 associated with I/O device 107. FIG. 2B shows a privileged page of address space 302 associated with I/O device 107.

Each of registers 400–405 are associated with an address in page 301 and in page 302. For instance, address 1P0 in page 301 is associated with register 400, address 1P1 in page 301 is associated with register 401, address 1P2 in page 301 is associated with register 402, address 1P3 in page 301 is associated with register 403, address 1P4 in page 301 is associated with register 404, address 1P5 in page 301 is associated with register 405, address 2P0 in page 302 is associated with register 400, address 2P1 in page 302 is associated with register 401, address 2P2 in page 302 is associated with register 402, address 2P3 in page 302 is associated with register 403, address 2P4 in page 302 is associated with register 404, and address 2P5 in page 302 is associated with register 405. The remainder of addresses in unprivileged page 301, represented by addresses 1P6–1P8, 1P29–1P31, and 1P505–1P511, and the remainder of addresses in privileged page 302, represented by addresses 2P6–2P8, 2P29–2P31, and 2P505–2P511 may have no registers associated with them, and thus may be unimplemented address space.

Although registers 400–405 are each associated with an address in unprivileged page 301 and an address in privileged page 302, registers 400–405 all are not fully implemented in both privileged page 302 and unprivileged page 301. For instance, registers 400, 402, and 403 may each be fully implemented only in privileged page 302. Unauthorized access to these registers might compromise system security, since register 400 can be used to directly interrupt processor 101 and registers 402, and 403 are involved in DMA transactions with system memory 102. Depending on implementation, read access to registers 400, 402, and 403 through unprivileged page 301 may be allowed. Register 401 is involved with transactions between device interface 411 and I/O adaptor 410. Ability to make these transactions is not a threat to system security; therefore, register 401 may be fully implemented in both unprivileged page 301 and privileged page 302. Although registers 404 and 405 are used in DMA transfers, if the system is properly designed these registers can be used without compromising system security. For instance a bit within a privileged register, such as register 403, may be used to enable DMA transactions, so that register 404 could only start a DMA transaction when a privileged process has enabled it.

Privileged and unprivileged registers should be implemented so that a read of these registers has no side effects in the system. A read should not, for instance, cause a new I/O operation. This allows a user process to observe and monitor I/O activity without allowing that user process to influence a device performing I/O.

Privileged and unprivileged registers should also be implemented so that a write to an unimplemented address is ignored or is equivalent to undefined data being written to some other implemented address in the same page.

The described embodiment provides for maximum flexibility of device assignment plus allows for system protection; however, several embodiments alternate to the foregoing are possible. For instance, each I/O device may be mapped into two memory pages a privileged page and an unprivileged page; however, every register is implemented in only one page. This may impact processor software performance, since for this scheme two page accesses are required to access all of an I/O device's control registers. Alternately, each user device may be mapped into a single page. This allows all registers in an I/O device to be accessed in one page, only provides security for I/O devices which have only unprivileged registers.

We claim:

1. A computing system comprising:
 a plurality of input/output devices, each input/output device including a plurality of registers for controlling the input/output device;
 local memory means for storing data, the local memory means including a first plurality of physical storage locations;
 system processing means for executing a plurality of processes the system processing means including:
  virtual address mapping means for assigning a global virtual address to each physical storage location in the local memory means and for assigning a global virtual address to each register in each input/output device, wherein the virtual address for each physical storage location in the local memory and the virtual address for each register in each input/output device does not differ depending upon which process from the plurality of processes is executing.

2. A computing device as in claim 1 wherein the global virtual addresses are grouped into pages, and wherein the virtual address mapping means contains an access code for each page of global virtual addresses.

3. A computing device as in claim 2 wherein each process has at least one access code and the processing means will not allow a first process having a first plurality of access codes to access a first virtual address in a first page of global virtual addresses, unless a first access code for the first page of global addresses matches an access code of the first process.

4. A computing device as in claim 3 wherein the virtual address mapping means assigns both a first global virtual address in the first page of global addresses and a second global virtual address in a second page of global virtual addresses to a first register in a first input/out device from the plurality of output devices, and the access code for the second page is different than the access code for the first page.

5. A computing device as in claim 4 wherein each page of global virtual addresses has an access code, a process from the plurality of processes with access to the first page of global addresses may read from but not write to global virtual addresses within the first page of global addresses, a process from the plurality of processes with access to the second page of global virtual addresses may read from and write to global virtual addresses within the second page of global addresses, and an access code for the first page is different than an access code for the second page.

6. A computing device as in claim 2 wherein each process from the plurality of processes has an access code, the virtual address mapping means contains an access code for each page of global virtual addresses, a first process from the plurality of processes with a first access code may read from but not write to global virtual addresses within a first page of global addresses, a second process from the plurality of processes with a second access code may read from and write to global virtual addresses within the first page, and the first access code is different than the second access code.

7. A computing device as in claim 2 wherein each process from the plurality of processes has an access code, the virtual address mapping means contains an access code for each page of global virtual addresses, a first process from the plurality of processes may read from but not write to global virtual addresses within a first page of global addresses, the first process may read from and write to global virtual addresses within a second page of global addresses, and an access code for the first page of global virtual addresses is different than an access code for the second page of global virtual addresses.

* * * * *